June 25, 1963

A. A. HORNER 3,095,217

TRUCK ADAPTER

Filed March 26, 1962

INVENTOR.
AMOS A. HORNER

BY Kimmel &Crowell
ATTORNEYS.

June 25, 1963
A. A. HORNER
3,095,217
TRUCK ADAPTER
Filed March 26, 1962
3 Sheets-Sheet 2
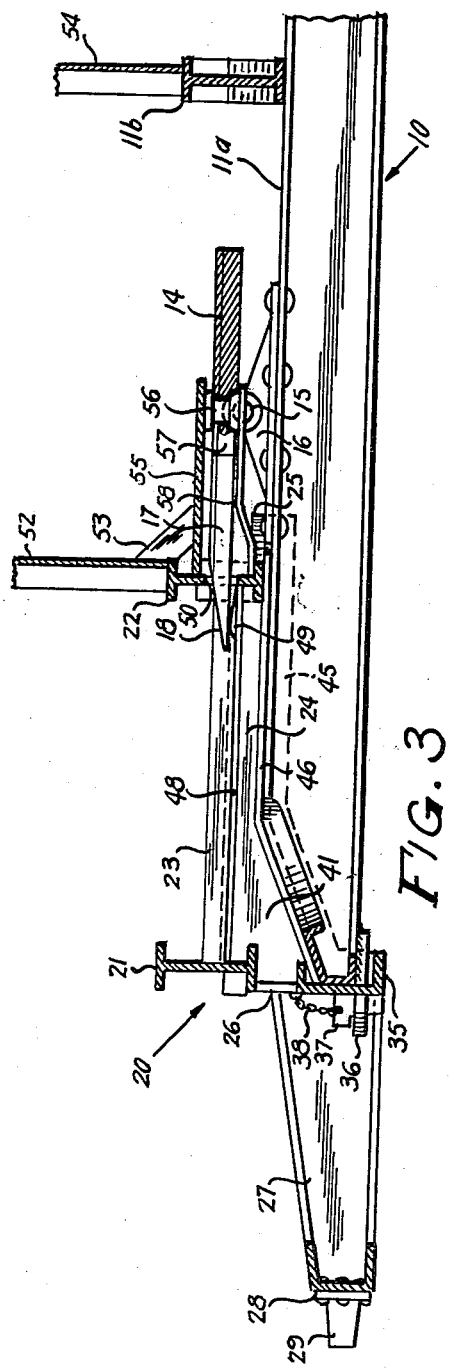
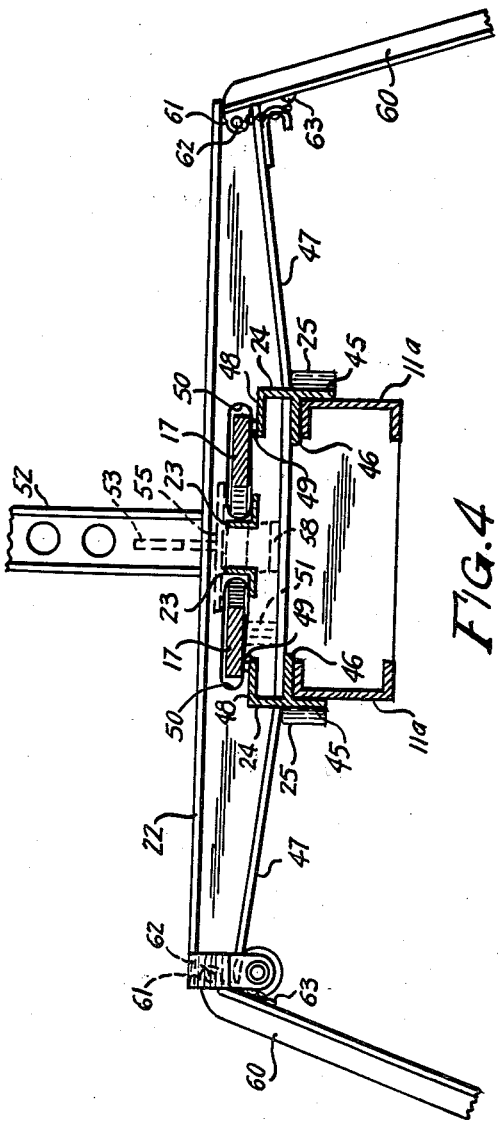
INVENTOR.
AMOS A. HORNER
BY Kimmel & Crowell
ATTORNEYS.

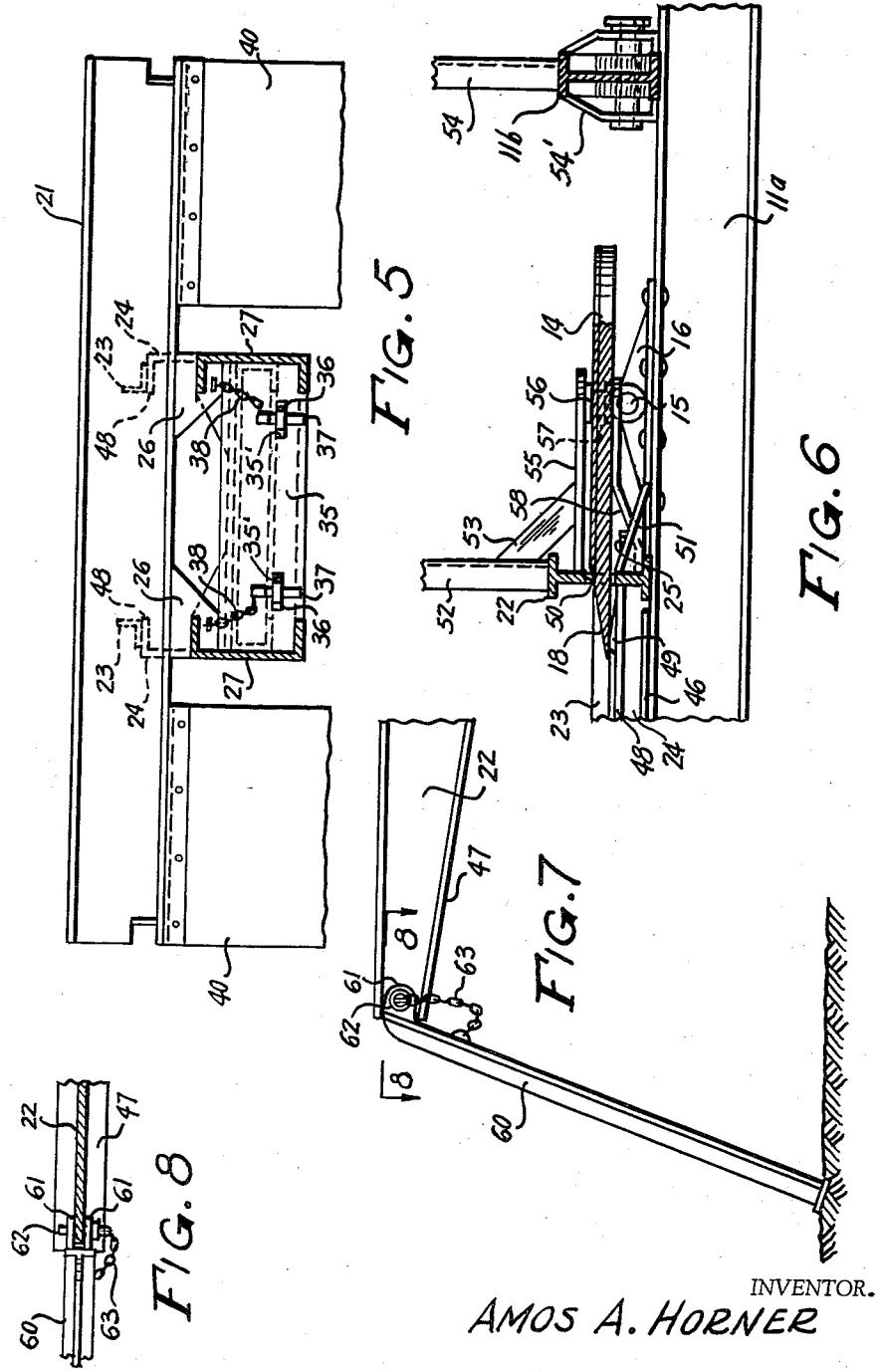

United States Patent Office 3,095,217
Patented June 25, 1963

3,095,217
TRUCK ADAPTER
Amos A. Horner, Star Rte. 2, Cascadia, Oreg.
Filed Mar. 26, 1962, Ser. No. 182,163
5 Claims. (Cl. 280—404)

This invention relates to a truck adapter, and has as its primary object the provision of an adapter which may be fitted over the fifth wheel of a conventional tractor in order to permit the attachment thereto of a four-wheel flat bottom trailer for hauling lumber, and providing space whereby the area normally occupied by the fifth wheel becomes a flat surface permitting the loading or carrying of additional lumber.

An additional object of the invention is the provision of such an adapter which may be readily applied to the tractor, and when the tractor is desired to be employed in such manner that its fifth wheel will be utilized to engage a trailer in a conventional manner, the adapter may be substantially immediately and easily removed.

An additional object of the invention is the provision of a device of this character which reduces the necessity for different types of tractors or trucks for different types of haulage and which is so arranged as readily to convert a conventional fifth wheel tractor into a simple tractor having a flat bed surface which is aligned with the adjacent surface of a four-wheel trailer.

Still other objects reside in the combinations of elements, arrangements of parts, and features of construction, all as will be more fully pointed out hereinafter and disclosed in the acompanying drawings wherein:

FIGURE 3 is an enlarged sectional view taken substantially along the line 3—3 of FIGURE 2 as viewed in the direction indicated by the arrows.

FIGURE 4 is an enlarged sectional view taken substantially along the line 4—4 of FIGURE 1 as viewed in the direction indicated by the arrows.

FIGURE 5 is an enlarged sectional view taken substantially along the line 5—5 of FIGURE 1 as viewed in the direction indicated by the arrows.

FIGURE 6 is an enlarged fragmentary sectional view taken substantially along the line 6—6 of FIGURE 2 as viewed in the direction indicated by the arrows.

FIG. 7 is an enlarged fragmentary view of a constructional detail; and

FIGURE 8 is a sectional view taken substantially along the line 8—8 of FIGURE 7 as viewed in the direction indicated by the arrows.

Similar reference characters refer to similar parts throughout the several views of the drawings.

Figure 1:
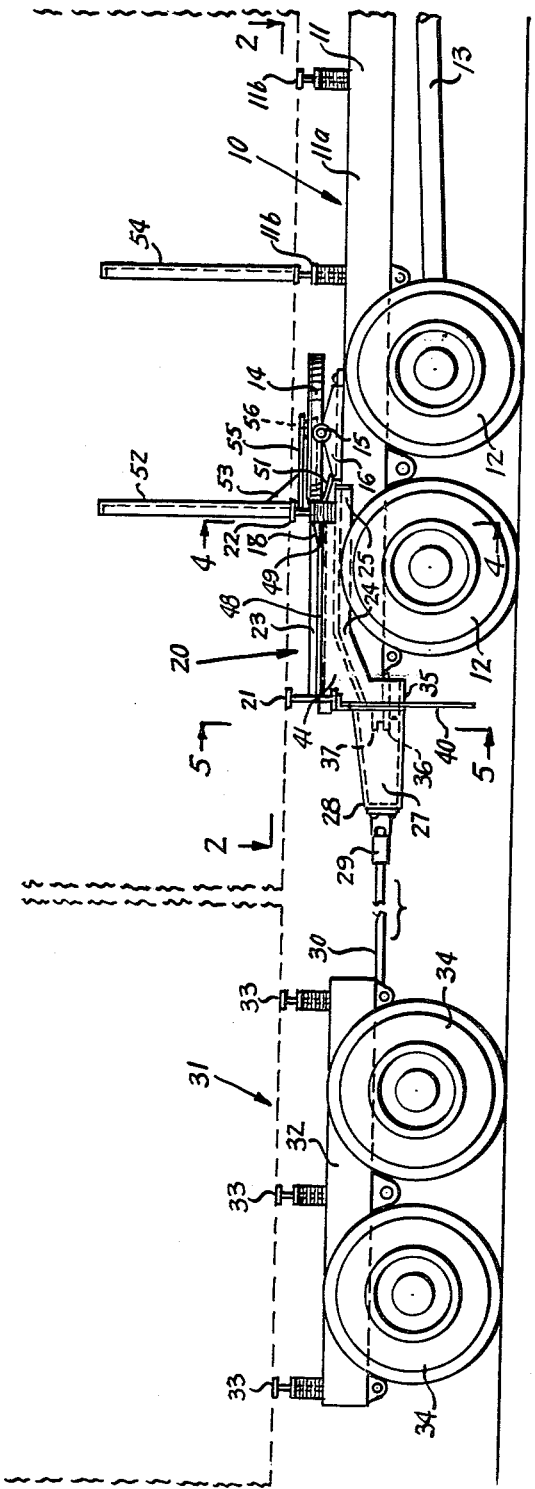
FIGURE 1 is a fragmentary partially schematic view of the adapter of the instant invention mounted on a tractor body and covering the fifth wheel thereof.
Figure 2:
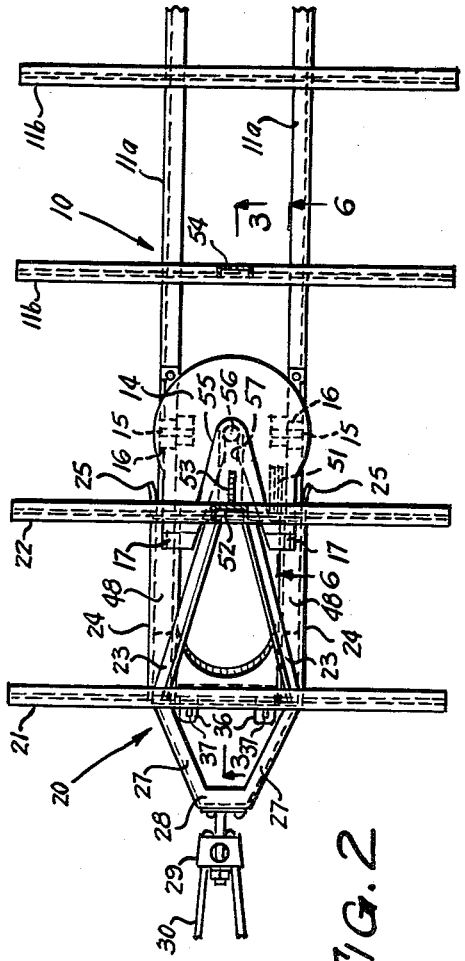
FIGURE 2 is a top plan view of a portion of FIGURE 1, partially sectioned, taken substantially along the line 2—2 of FIGURE 1.

Having reference now to the drawings in detail, and more particularly to FIGS. 1 and 2, there is generally indicated at 10 a fragment of a tractor vehicle, which includes the usual frame 11 and power driven wheels 12 which are driven from a conventional motor through a drive shaft 13. The tractor has mounted thereon adjacent its rear end a conventional fifth wheel 14 which is pivotally mounted on a pivot 15 on supporting members 16 carried by the side frame bars 11a. The fifth wheel includes a bifurcated portion ending in extremities 17, which are tapered as at 18 to permit the engagement of a fifth wheel with a normal or conventional trailer body.

The adapter of the instant invention is generally indicated at 20, and comprises a rear I-beam 21 and a front I-beam 22. Converging angle irons 23 extend between the beams 21 and 22, and serve as a connection therebetween. Flat strips 24 extend from beam 21 and are fixedly secured thereto. The strips 24 have outwardly flared ends 25 to enable the same to pass on the outer sides of the frame beams 11a of the tractor. The beams 21 and 22 are of transverse width substantially equal to the cross frame I-beams 11b of frame 11.

Rear beam 21 has a depending flange 26 substantially centrally located thereon which supports a pair of channel members 27 which are arranged in converging relation as best shown in FIGURE 2 and terminate in a flattened portion 28 to which is secured a conventional trailer hitch 29, which includes connecting rods or members 30 which in turn are connected to a lumber trailer generally indicated at 31 and including a frame 32 having transverse I-beams 33 extending thereacross and serving as load supports, the beams 33 being the same width as the beams 21, 22, and 11b. The trailer is supported on the usual wheels 34, and when connected with the tractor in a manner to be more fully described hereinafter, it will readily be seen that a plurality of transverse supports 33, 21, 22, and 11b are positioned along substantially the entire length of the tractor and its associated trailer for the support of lumber or similar materials.

A transversely extending channel member 35 extends between the ends of members 27, and is provided with openings 35' through which extend apertured lugs 36 normally carried by the rear end of the tractor body and through the apertures in which are extended locking pins 37 secured in position and against loss by chains 38, the pins and lugs serving in part to secure the adapter to the tractor body.

Splash guards 40 depend from I-beams 21 on either side thereof in a conventional manner.

Side plates or members 24 are provided adjacent their rear ends with depending skirtlike portions 41 which surround the ends of channel member 34 and the ends of members 27.

Channel members 45 extend from plate 34 forwardly and are connected to flanges 46 carried by the underside of I-beam 22, it being noted that the opposite ends of I-beam 22 taper upwardly as indicated at 47. The guide members 24 are secured as by welding to the sides of members 45, and include inwardly extending horizontal flanges 48. Flanges 48 have triangular lifting guides 49 thereon which engage the tapered ends 18 of the bifurcations 17 of fifth wheel 14 for the purpose of lifting the same into level position when the adapter is assembled with the tractor. The bifurcated ends 17 extend, as best shown in FIG. 4, through openings 50 in the web of I-beam 47 to permit the positioning of the beam 22 over fifth wheel 14.

Inclined guide plates 51 are positioned on the forward side of beam 22, that is, the side toward the tractor vehicle for the purpose of lifting the fifth wheel 14 to level position to permit the ends 18 of the bifurcations 17 thereof to extend through the openings 50, and be held in level position by the member 49. Beam 22 carries an apertured upright 52 which carries a bracing bar 53, which in conjunction with a conventional upright 54 carried by the tractor body and pivotally mounted thereon as on pivot 56, serves as a support for the necessary cables and conduits for wiring, brakes, etc., employed on the trailer. Bracing bar 53 in turn supports a substantially triangular tongue 55. Conventional load tightening winches 54' may be positioned on the ends of beams 22 and 11b.

From the foregoing it will now be seen that when the adapter 20 is applied to the tractor vehicle 10, the fifth wheel 14 is substantially automatically leveled and held in level position by means of the members 51 and 49. It will also be seen that the parts are firmly secured together by means of the lugs 36 and their associated locking pins 37. The substantially triangular tongue 55 extends inwardly and forwardly from beam 22, and is provided with a pin 56 which engages in the slot 57 of the fifth wheel for additional securing purposes and is supported by an offset plate 58 carried by beam 22.

In order to support the adapter in a position such that the tractor vehicle may be backed into position thereunder, removable legs 60 are provided at each end of beam 22. The legs 60 are provided with apertured bifurcations 61, which engage on opposite sides of the web of beam 22 and are held in position by means of locking pins 62 which are secured as by means of chains 63 to prevent loss. Obviously, after the device has been positioned and clamped to the tractor, the legs 60 may be removed and the device is ready for use.

From the foregoing it will now be seen that there is herein provided an improved adapter which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:

1. An adapter for tractor vehicles of the type embodying a bifurcated fifth wheel for connection purposes, and having apertured lugs extending from the rear thereof, said adapter comprising front and rear spaced transverse beams, longitudinally extending connections between said beams, said front beam having openings therein for the reception of the bifurcations of the fifth wheel, a plate depending from said rear beam, a connection for a trailer secured to said plate, openings in said plate for the reception of the apertured lugs of the tractor, pins engaging the apertures in said lugs for securing said adapter to the tractor, and connecting means extending from said front beam into the slot of the fifth wheel.

2. An adapter for tractor vehicles of the type embodying a bifurcated fifth wheel for connection purposes, and having apertured lugs extending from the rear thereof, said adapter comprising front and rear spaced transverse beams, longitudinally extending connections between said beams, said front beam having openings therein for the reception of the bifurcations of the fifth wheel, a plate depending from said rear beam, a connection for a trailer secured to said plate, openings in said plate for the reception of the apertured lugs of the tractor, pins engaging the apertures in said lugs for securing said adapter to the tractor, connecting means extending from said front beam into the slot of the fifth wheel,
and an inclined guide means extending beneath the bifurcated end of the fifth wheel for leveling the same to direct the bifurcations into said openings in said front beam.

3. An adapter for tractor vehicles of the type embodying a bifurcated fifth wheel for connection purposes, and having apertured lugs extending from the rear thereof, said adapter comprising front and rear spaced transverse beams, longitudinally extending connections between said beams, said front beam having openings therein for the reception of the bifurcations of the fifth wheel, a plate depending from said rear beam, a connection for a trailer secured to said plate, openings in said plate for the reception of the apertured lugs of the tractor, pins engaging the apertures in said lugs for securing said adapter to the tractor, connecting means extending from said front beam into the slot of the fifth wheel, an inclined guide means extending beneath the bifurcated end of the fifth wheel for leveling the same to direct the bifurcations into said openings in said front beam,
and an inclined support on the side of said front beam opposite said guide means for retaining said bifurcations in level position after said bifurcations have extended through said openings.

4. An adapter for tractor vehicles of the type embodying a bifurcated fifth wheel for connection purposes, and having apertured lugs extending from the rear thereof, said adapter comprising front and rear spaced transverse beams, longitudinally extending connections between said beams, said front beam having openings therein for the reception of the bifurcations of the fifth wheel, a plate depending from said rear beam, a connection for a trailer secured to said plate, openings in said plate for the reception of the apertured lugs of the tractor, pins engaging the apertures in said lugs for securing said adapter to the tractor, connecting means extending from said front beam into the slot of the fifth wheel, an inclined guide means extending beneath the bifurcated end of the fifth wheel for leveling the same to direct the bifurcations into said openings in said front beam, an inclined support on the side of said front beam opposite said guide means for retaining said bifurcations in level position after said bifurcations have extended through said openings,
and supporting legs removably secured to the ends of said front beam for holding said adapter in level position to facilitate the backing of the tractor thereunder to position said adapter.

5. An adapter for tractor vehicles of the type embodying a bifurcated fifth wheel for connection purposes, and having apertured lugs extending from the rear thereof, said adapter comprising front and rear spaced transverse beams, longitudinally extending connections between said beams, said front beam having openings therein for the reception of the bifurcations of the fifth wheel, a plate depending from said rear beam, a connection for a trailer secured to said plate, openings in said plate for the reception of the apertured lugs of the tractor, pins engaging the apertures in said lugs for securing said adapter to the tractor, connecting means extending from said front beam into the slot of the fifth wheel, an inclined guide means extending beneath the bifurcated end of the fifth wheel for leveling the same to direct the bifurcations into said openings in said front beam, an inclined support on the side of said front beam opposite said guide means for retaining said bifurcations in level position after said bifurcations have extended through said openings, supporting legs removably secured to the ends of said front beam for holding said adapter in level position to facilitate the backing of the tractor thereunder to position said adapter,
said legs having apertured lugs at one end thereof and a locking pin extending through the apertures therein and through an aligned opening carried by the end of said first beam.

References Cited in the file of this patent

UNITED STATES PATENTS

| | | |
|---|---|---|
| 880,982 | Felkey | Mar. 3, 1908 |
| 2,419,442 | Dorsey | Apr. 22, 1947 |
| 2,466,938 | Evans et al. | Apr. 12, 1949 |
| 2,605,113 | Gilmore | July 29, 1952 |
| 2,671,670 | Page | Mar. 9, 1954 |
| 2,900,198 | Patton | Aug. 18, 1959 |